United States Patent
Burk et al.

(10) Patent No.: US 6,843,312 B2
(45) Date of Patent: Jan. 18, 2005

(54) AIR CONDITIONING SYSTEM AND OPERATING METHOD FOR A MOTOR VEHICLE WITH HEAT PUMP AND/OR REHEAT OPERATING MODE

(75) Inventors: Roland Burk, Stuttgart (DE); Hans-Joachim Krauss, Stuttgart (DE); Hagen Mittelstrass, Bondorf (DE); Karl-Heinz Staffa, Stuttgart (DE); Christoph Walter, Stuttgart (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/783,533

(22) Filed: Feb. 15, 2001

(65) Prior Publication Data

US 2001/0013409 A1 Aug. 16, 2001

(30) Foreign Application Priority Data

Feb. 15, 2000 (DE) ......................................... 100 06 513

(51) Int. Cl.[7] ............................. F25B 29/00; F25B 27/00
(52) U.S. Cl. ......................... 165/240; 165/43; 165/299; 237/5; 237/12.3 B; 62/238.6; 62/196.4
(58) Field of Search ............................. 165/42, 43, 240, 165/299, 202; 62/238.6, 196.4; 237/2 B, 5, 12.3 B, 12.3 R (56) References Cited

U.S. PATENT DOCUMENTS

| | | | | |
|---|---|---|---|---|
| 5,181,392 A | * | 1/1993 | Itoh et al. | |
| 5,641,016 A | | 6/1997 | Isaji et al. | ................. 165/43 |
| 5,706,664 A | * | 1/1998 | Hara | ................. 62/196.4 X |
| 5,725,048 A | * | 3/1998 | Burk et al. | ................. 165/42 |
| 5,749,235 A | * | 5/1998 | Ueda | ................. 165/43 X |
| 5,782,102 A | * | 7/1998 | Iritani et al. | |
| 5,878,589 A | * | 3/1999 | Tanaka et al. | |
| 6,037,567 A | * | 3/2000 | Inoue et al. | ................. 165/299 X |
| 6,047,770 A | * | 4/2000 | Suzuki et al. | ................. 165/202 |
| 6,105,666 A | * | 8/2000 | Tajima et al. | ................. 165/240 X |
| 6,357,541 B1 | * | 3/2002 | Matsuda et al. | ................. 165/43 X |
| 6,370,903 B1 | * | 4/2002 | Wlech | |

FOREIGN PATENT DOCUMENTS

| | | |
|---|---|---|
| DE | 30 47 955 | 7/1982 |
| DE | 40 27 964 | 2/1992 |
| DE | 195 37 801 | 4/1996 |
| DE | 196 44 583 | 4/1998 |
| DE | 198 06 654 | 8/1999 |

OTHER PUBLICATIONS

Hafner et al., "An Automobile HVAC System with $CO_2$ as the Refrigerant", IIF–IIR—Sections B and E—Oslo Norway (1998) pp. 289–298.

Noda et al., "Development of Twin–Heated Ventilation & Air Conditioning System (ThVACS)", Heat Management of Vehicles, Chapter 5.1, pp. 227–241.

* cited by examiner

*Primary Examiner*—Ljiljana Ciric
(74) *Attorney, Agent, or Firm*—Crowell & Moring LLP (57) ABSTRACT

An air conditioning system has a refrigerant cycle, a coolant cycle, a refrigerant/coolant heat exchanger, coupling these cycles so as to transfer heat, and a valve for operating mode-dependent control of the refrigerant flow, whereby the air conditioning system can be operated not only in air conditioning mode but also in a heat pump or reheat mode. An internal combustion engine exhaust gas/coolant heat exchanger is connected upstream in series to the refrigerant/coolant heat exchanger in the coolant cycle in the heat pump mode; and/or in the reheat operating mode the refrigerant/coolant heat exchanger functions as a condenser/gas cooler, connected upstream in series on the coolant side to the supply air/coolant heat exchanger. In addition or as an alternative, a drying operating mode can be provided for drying the supply air/refrigerant heat exchanger with reversed air conveying direction.

20 Claims, 9 Drawing Sheets

AIR CONDITIONING SYSTEM AND OPERATING METHOD FOR A MOTOR VEHICLE WITH HEAT PUMP AND/OR REHEAT OPERATING MODE

BACKGROUND AND SUMMARY OF THE INVENTION

This application claims the priority of German Patent Document 100 06 513.9, filed in Germany, Feb. 15, 2000, the disclosures of which is expressly incorporated by reference herein.

The invention relates to an air conditioning system for a motor vehicle.

Preferred embodiments relate to such an air conditioning system which is designed for an air conditioning operating mode and at least one other operating mode in the form of at least one of a heat pump operating mode and a reheat operating mode, said air conditioning system comprising:

a refrigerant cycle with a compressor, a refrigerant cooler and a supply air/refrigerant heat exchanger, said supply air/refrigerant heat exchanger being disposed in a supply air channel and functioning as an evaporator in an air conditioning operating mode, a coolant cycle for cooling a heat generating vehicle component, a refrigerant/coolant heat exchanger, coupling the refrigerant cycle and the coolant cycle so as to transfer heat, and refrigerant flow control valves for controlling mode-dependent dependent flow of the refrigerant so as to be guided in an air conditioning mode from the compressor over the refrigerant cooler to the supply air/refrigerant heat exchanger.

Air conditioning systems of the type referred to can be operated selectively, i.e. reversibly, in an air conditioning operating mode and at least one other operating mode, in particular a heat pump operating mode and/or a reheat operating mode, and are designed correspondingly to this end. This feature comprises in particular the presence of a refrigerant cycle, on the one hand, and a coolant cycle, on the other hand, both of which transfer heat and are coupled by a refrigerant/coolant heat exchanger. In the air conditioning mode the supply air/refrigerant heat exchanger works as an evaporator, which cools the supply air, in order to pass it then, for example, into the vehicle interior. In the heat pump mode the supply air/refrigerant heat exchanger functions as a heater by reversing the refrigerant's direction of flow in order to heat the supply air. In this case the refrigerant/coolant heat exchanger functions as an evaporator, which extracts the heat from the coolant and uses said heat to evaporate the refrigerant. In the reheat mode the supply air is cooled in the supply air/refrigerant heat exchanger, functioning as an evaporator, and heated again in a supply air/coolant heat exchanger, functioning as a heater. Suitable refrigerants are, for example, carbon dioxide and R134a. The coolant cycle serves to cool a heat generating vehicle component, which can be in particular an internal combustion engine, functioning as the vehicle drive motor, where a mixture of water and glycol are usually used as the coolant.

An air conditioning system of the aforementioned type is described in the published patent application (Offenlegungsschrift) DE 198 06 654 A1. In said arrangement the coolant can be fed, after passing the housing of an internal combustion engine, in a controlled manner to the refrigerant/coolant heat exchanger and/or to a supply air/coolant heat exchanger, which runs parallel in the coolant cycle, and/or a coolant cooler, which is also arranged parallel in the coolant cycle. The latter is usually defined as a cooling air/coolant heat exchanger, which cools the coolant with ambient air. The refrigerant cycle of this prior art air conditioning system comprises, among other things, a medium pressure accumulator, to which an expansion element is attached on both sides. Both of them must be designed in such a manner that the throughflow is bidirectional.

In addition, there exist various other types of this class of air conditioning system that can be operated selectively at least in the air conditioning mode or in the heat pump mode and/or reheat mode. Thus, an air conditioning system, described in the publication by A. Hafner et al., "An Automobile HVAC System with $CO_2$ as the Refrigerant", IIF-IIR—Sections B and E, Oslo, Norway, 1998, page 289, exhibits two supply air/refrigerant heat exchangers, both of which function as evaporators in the air conditioning mode, whereas in a heating or heat pump mode, designed as a reheating operation, the supply air/refrigerant heat exchanger, which is downstream in the supply air's direction of flow, functions as a heater for heating the supply air. To control the flow of refrigerant, a 4 way valve and a 3 way valve are provided. In addition, the refrigerant cycle comprises an internal heat exchanger, a low pressure-sided accumulator and an exhaust air/refrigerant heat exchanger for heat recovery. In the heat pump mode, a refrigerant/coolant heat exchanger, which couples the $CO_2$ operated refrigerant cycle with a coolant cycle of the internal combustion engine of a vehicle drive, transfers heat from the coolant to the refrigerant, whereas it functions inversely in the cooling mode as a refrigerant cooler, which transfers the heat from the refrigerant to the coolant. To this end, it is coupled in the air conditioning mode on the input side of the refrigerant to the output side of a compressor of the refrigerant cycle.

The textbook contribution by Y. Noda et al., chapter 5.1 "Development of Twin-Heated Ventilation and Air Conditioning System (ThVACS)" in Heat Management of Vehicles, edited by N. Deuessen (ed.), expert-verlag, page 227, describes an air conditioning system, in which a heat exchanger, working as a condenser in the air conditioning mode, is bypassed by the high pressure-sided refrigerant stream in a heating mode, designed as a reheat mode. Instead, said high pressure-sided refrigerant stream is fed to an auxiliary condenser, disposed in a supply air channel, and from there fed to an evaporator, connected upstream in series to an auxiliary condenser in the supply air channel. The refrigerant, issuing from the evaporator, is guided over a refrigerant/coolant heat exchanger, designed as an auxiliary evaporator, and from there over an accumulator to a compressor. In the coolant cycle, with which the vehicle drive internal combustion engine is cooled, there is, among other things, a heater, disposed in the supply air channel.

In an air conditioning system, disclosed in the U.S. Pat. No. 5,641,016, with selective air conditioning and heat pump mode, a refrigerant cycle and a coolant cycle are coupled by means of a refrigerant/coolant heat exchanger, which is disposed, independently of the operating mode, on the refrigerant side between the compressor and a refrigerant cooler. In heat pump mode, an evaporator, arranged in the supply air channel, is bypassed by the refrigerant stream. The coolant cycle, which uses water as the coolant, absorbs exhaust heat from, among other things, a vehicle drive internal combustion engine and can also be heated, as desired, by a burner. The supply air can be heated by heated cooling water by means of a supply air/coolant heat exchanger, arranged in the supply air channel.

The use of air conditioning systems of the aforementioned type is especially important for low consumption vehicles, which exhibit an internal combustion engine, e.g. a diesel engine, as the drive motor. Said diesel engine exhibits direct injection and a relatively low fuel consumption and, therefore, generates, comparatively little exhaust heat, which by itself is no longer adequate to heat the interior of the vehicle to a comfortable temperature level in an acceptable period of time with the coolant cycle. Not even defrosting the front windshield and side windows is guaranteed in each case with just the exhaust heat of such a low consumption engine. Of course, a number of additional heating designs have been proposed to cover this heat capacity deficit. They use the primary energy from fuel either directly by burning the fuel in a burner or by converting into heat a portion of the mechanical shaft output of the internal combustion engine by means of a suitable energy converter and feed the heat to the interior either directly, e.g. by means of PTC [=positive temperature coefficient] heating elements, or by means of the coolant, e.g. by means of viscous heaters or retarders. However, these solutions require an additional consumption of fuel at a usually unsatisfactory ratio of additional heating capacity to primary energy consumption and/or are so unproductive that the spontaneous heating capacity is not significantly improved and, therefore, the heating dynamics cannot be significantly improved at least in the first part of the heating phase. Another attempt to solve this problem endeavors to reduce the heat requirement through an increase in air circulation in combination with circulating air driers or heat recovery from the outgoing air of the interior. In this manner it is at least possible to lower the heating capacity requirement during the stationary heating mode, but the time required to heat up an initially cold vehicle interior cannot be significantly shortened.

The invention is also based on the technical problem of providing an air conditioning system of the aforementioned class that with relatively simple means permits the option of not only an air conditioning mode but also an effective heat pump and/or reheat mode. Moreover, the invention avoids the known problem of re-evaporation of the water of condensation from the supply air/refrigerant heat exchanger, which is used as the evaporator as a function of the operating mode, into the supply air, passed into the interior of the vehicle.

Preferred embodiments of the invention solve these problems by providing an air conditioning system for a motor vehicle, which is designed for an air conditioning operating mode and at least one other operating mode in the form of at least one of a heat pump operating mode and a reheat operating mode, said air conditioning system comprising:

a refrigerant cycle with a compressor, a refrigerant cooler and a supply air/refrigerant heat exchanger, said supply air/refrigerant heat exchanger being disposed in a supply air channel of an air supply conveying unit and functioning as an evaporator in an air conditioning operating mode, characterized by one or more of the following features:

(a) the provision of an internal combustion engine exhaust gas/coolant heat exchanger connected upstream in series to the refrigerant/coolant heat exchanger in the coolant cycle (b) the provision that said at least one other operating mode includes a reheat operating mode, in which the refrigerant flow control valves guide refrigerant flow from the compressor at least in part to the refrigerant/coolant heat exchanger, functioning as the condenser/gas cooler in this operating mode, and from there to the supply air/refrigerant heat exchanger, functioning as the evaporator in this operating mode, and wherein the refrigerant/coolant heat exchanger is connected upstream in series on the coolant side to a supply air/coolant heat exchanger disposed in the supply air channel; and (c) the provision that the supply air conveying unit exhibits two operating modes with opposite supply air conveying directions, and wherein the air conditioning system is designed for carrying out a drying operating mode, in that the supply air conveying unit conveys drying air for drying the supply air/refrigerant heat exchanger in the air conveying direction, reversed to the supply air conveying direction leading into the vehicle interior, past the supply air/refrigerant heat exchanger, whereby the drying mode is activated at least after shutdown of the vehicle in a previous air conditioning or reheat mode.

In the air conditioning system, according to certain is preferred embodiments of the invention, an internal combustion engine exhaust gas/coolant heat exchanger is connected upstream in series with the refrigerant/coolant heat exchanger in the coolant cycle. This feature enables the use not only of the exhaust heat, generated in the internal combustion engine itself but also the heat of the exhaust gas, emitted by said engine, e.g. in a heat pump operating mode of the air conditioning system. In this manner the goal of heating the supply air comparatively fast for the purpose of quickly heating up the initially cold vehicle interior is attained, since in the case of a cold start the exhaust gas from the engine is the medium with the fastest temperature increase.

The air conditioning system, according to certain preferred embodiments of the invention, is designed to carry out a specific reheat operating mode, wherein the refrigerant/coolant heat exchanger functions as the condenser/gas cooler of the refrigerant cycle and is connected upstream in series to a supply air/coolant heat exchanger, functioning as the heater, in the coolant cycle. Said supply air/coolant heat exchanger is disposed in turn in a supply air flow channel behind the supply air/refrigerant heat exchanger, functioning as the evaporator. Thus, the heat, withdrawn from the supply air at the evaporator in the refrigerant cycle, can be fed again for the purpose of heating by means of the refrigerant/coolant heat exchanger and the supply air/coolant heat exchanger to the supply air stream, which has been cooled for the purpose of drying. In addition, the engine exhaust heat can be used, if present, for heating the supply air.

It is preferred in conjunction with certain embodiments of the invention that, in the coolant cycle, the internal combustion engine exhaust gas/coolant heat exchanger is connected upstream in series to the refrigerant/coolant heat exchanger so that the exhaust gas heat can also be used to reheat the supply air, a feature that is especially expedient in the case of a cold start at low external temperatures and the use of a low consumption engine in order to achieve effective reheating.

In a further development of preferred embodiments of the invention, the refrigerant flow controller, which suitably controls the refrigerant flow in the different operating modes, includes a 4 way valve and a 3 way valve. The refrigerant/coolant heat exchanger, the refrigerant cooler and the 4 way valve are attached to the 3 way valve, whereas the supply air/refrigerant heat exchanger and the inlet and the outlet side of the compressor are connected not only to the 3 way valve but also directly or indirectly to the 4 way valve. With this valve configuration the direction of the refrigerant flow can be reversed. In addition, the refrigerant/coolant heat exchanger or the refrigerant cooler or both can be switched selectively into the active refrigerant cycle.

According to another advantageous feature of certain preferred embodiments of the invention, the high pressure-sided accumulator in the refrigerant cycle includes a check valve arrangement, which suitably connects the accumulator on the inlet and outlet side to the refrigerant cooler, the supply air/refrigerant heat exchanger, and the refrigerant/coolant heat exchanger. As an alternative advantageous feature of certain preferred embodiments of the invention, a low pressure-sided accumulator is provided in combination with an internal heat exchanger.

Certain preferred embodiments of an air conditioning system, according to the invention include a supply air conveying unit, which can be switched over into a first or a reversed, second conveying direction, and with which the air conditioning system can be operated in a drying operating mode by means of corresponding controlling means. In this mode the flow direction of the supply air is reversed by way of the supply air/refrigerant heat exchanger into that in the one or the other operating mode. Thus, the supply air/refrigerant heat exchanger can be dried when in the previous operating mode water of condensation has condensed on said heat exchanger so that no moist air passes into the vehicle interior. This is especially useful for restarting the vehicle in cases where the air conditioning system was in air conditioning or reheating mode when the vehicle was previously turned off.

Other objects, advantages and novel features of the present invention will become apparent from the following detailed description of the invention when considered in conjunction with the accompanying drawings.

DETAILED DESCRIPTION OF THE DRAWINGS

Figure 1:
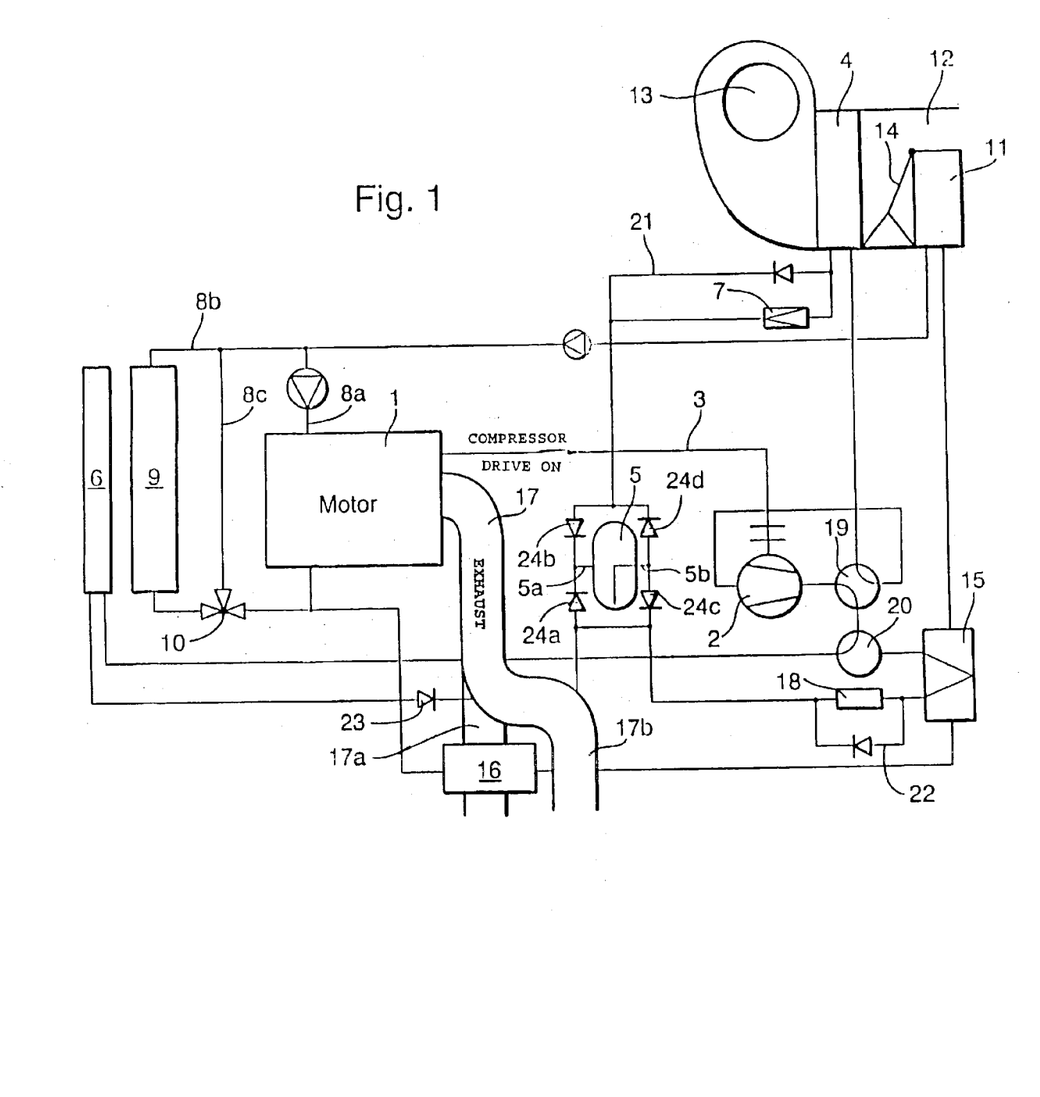
FIG. 1 is a block diagram of a motor vehicle air conditioning system constructed according to a first preferred embodiment of the invention, which is operated, e.g. with the refrigerant R134a and exhibits a high pressure-sided accumulator and assigned check valve arrangement in the state of air conditioning.

FIG. 1 depicts an air conditioning system of a motor vehicle with an internal combustion engine 1 as the vehicle drive engine, which is designed preferably as a low consumption engine, e.g. in the form of a diesel engine with direct injection. The air conditioning system comprises a refrigerant cycle with a compressor 2, which can be mechanically coupled to the internal combustion engine 1 by means of a drive connection 3 and can be thus driven by said engine; a cooling air/refrigerant heat exchanger 6, functioning as a refrigerant cooler; a high pressure-sided accumulator 5; a supply air/refrigerant heat exchanger 4; and a first expansion element 7, assigned to said heat exchanger. Furthermore, the air conditioning system comprises a coolant cycle, which absorbs, among other things, the exhaust heat of the engine 1 and thereby cools it. For this purpose a corresponding branch 8a of the coolant cycle is led through the engine block 1. In a parallel coolant cycle branch 8b there is a cooling air/coolant heat exchanger 9, which functions as a coolant cooler and by means of which a cooling air stream can be led away in the customary manner, just as over the refrigerant cooler 6. Over a bypass line 8c and a thermostat 10 the coolant cooler 9 can be short-circuited, i.e. bypassed by the coolant, a feature that is especially useful for the cold start case, until the engine 1 has reached its operating temperature, so that this occurs as fast as possible. Furthermore, the coolant cycle includes in the customary manner a supply air/coolant heat exchanger 11, which functions as the heater. Said exchanger is also located in the customary manner in a supply air channel 12 of an air conditioning unit, by means of which supply air can be led from the outside into the vehicle interior by means of the action of a supply air conveying unit in the form of a conveying blower 13. The heater 11 is disposed in the flow direction of the supply air behind the supply air/refrigerant heat exchanger 4. By means of a reversible flap 14 the supply or fresh air, fed in from the outside, can be led optionally over the heater 11 or past said heater. A suitable coolant is, for example, a mixture of water and glycol; a suitable refrigerant, for example R134a.

Additional system components include a refrigerant/coolant heat exchanger 15, by means of which the refrigerant cycle and the coolant cycle can be connected together for thermal transmission and to which a second expansion operation 18 is assigned. In the coolant cycle there is also an exhaust gas/coolant heat exchanger 16, which is positioned on the exhaust gas side in one of two parallel exhaust gas branches 17a, 17b, into which branches an exhaust gas tract 17, which empties out of the engine 1. In so doing, the exhaust gas/coolant heat exchanger 16 is connected upstream with respect to the flow direction of the coolant to the refrigerant/coolant heat exchanger 15, which in turn is connected downstream in series with the supply air/coolant heat exchanger 11.

For selective control of the air conditioning system operation in one of several possible operating modes there are the related air conditioning system control means, which for the sake of simplicity are shown here and described only to the extent that the expert would not know these means from conventional systems without more effort. Hence they comprise, among other things, suitable refrigerant flow control means. The latter includes a controllable 4 way valve 19, a controllable 3 way valve 20, one bypass line 21, 22 each with check valve for bypassing the first or second expansion element 7, 18, a check valve 23 in the refrigerant cycle between the refrigerant cooler 6 and the accumulator 5 as well as a check valve arrangement, which is assigned to the accumulator 5 and comprises four check valves 24a to 24d, of which two are connected counter-clockwise and assigned to the accumulator inlet side 5a and the accumulator outlet side 5b. The function of these control means will be apparent from the following explanation of the different operating modes of the system.

FIG. 1 depicts the air conditioning system in an air conditioning operating mode. In this mode the output of the compressor 2 is connected over the suitably switched 4 way valve and the 3 way valve to the refrigerant cooler 6, from which the refrigerant, which is compressed through activation of the compressor 2 and cooled, e.g. condensed in the refrigerant cooler 6, passes to the accumulator 5. From there it flows to the first expansion element 7, by means of which the supply air/refrigerant heat exchanger 4, which is connected downstream in series, functions as an evaporator, where the supplied supply air cools down in order to be blown as the cooling air stream into the vehicle interior while bypassing the heater 11. From the supply air/refrigerant heat exchanger 4 in evaporator function, the refrigerant flows over the 4 way valve 19 to the compressor inlet side.

In this air conditioning operating mode of the system the refrigerant does not flow through the refrigerant/coolant heat exchanger 15 when the 3 way valve is suitably switched. Since the air conditioning mode does not require that the supply air be heated, the engine exhaust gas is guided over the exhaust gas line branch 17b, which is not provided with the exhaust gas/coolant heat exchanger 16. In this case the coolant cycle serves primarily to carry away the engine exhaust heat over the coolant cooler 9.

Figure 2:
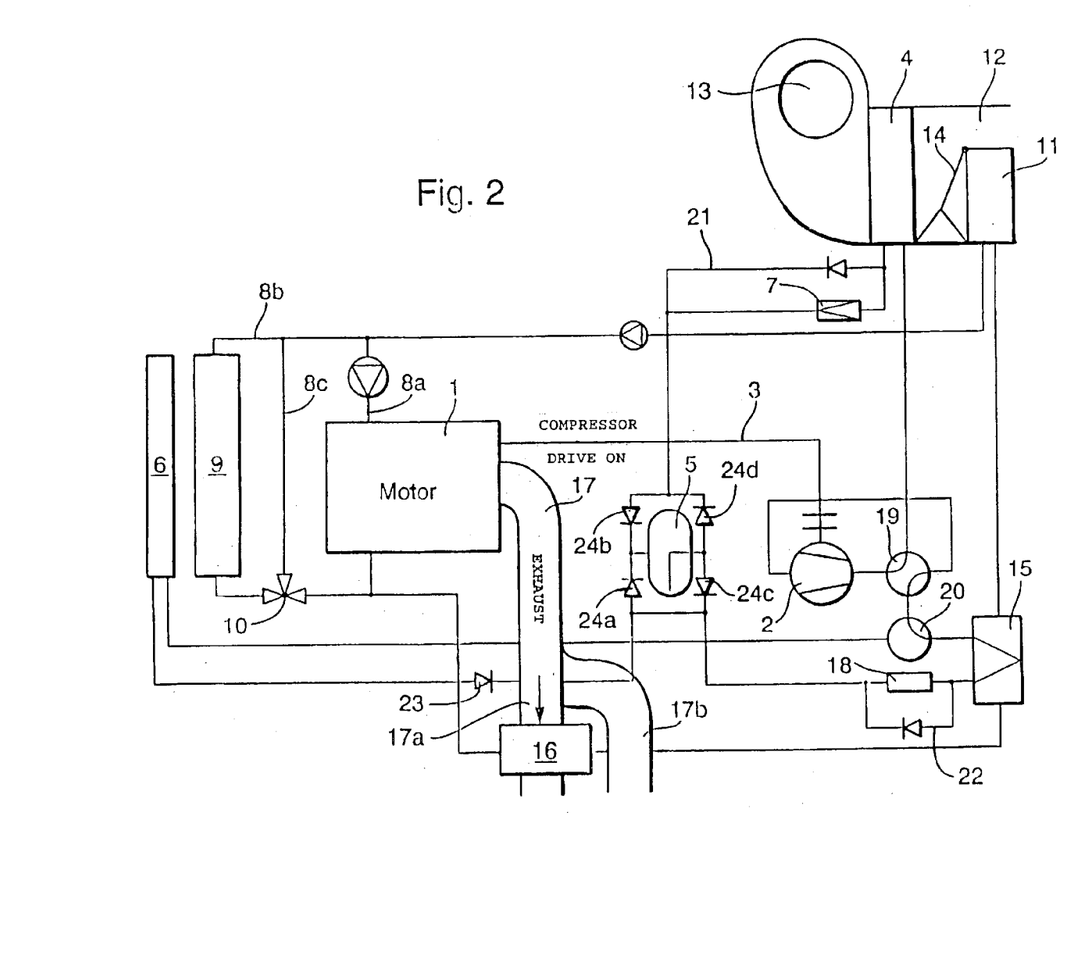
FIG. 2 is a view corresponding to FIG. 1, but with the system in the state of operating as a heat pump.

FIG. 2 shows the air conditioning system of FIG. 1 in a heat pump operating mode. To this end, through suitable control of the 4 way valve the supply air/refrigerant heat exchanger 4 is connected to the output of the compressor 2, which is also active in this operating mode and, therefore, functions as a supply air heating element and simultaneously as a cooling element, i.e. condenser or gas cooler, for the refrigerant. From there the cooled refrigerant bypasses the assigned expansion element 7 and flows over the bypass line 21 into the accumulator 5. The refrigerant, issuing from the accumulator 5, flows over the second expansion element 18 into the refrigerant/coolant heat exchanger 15, which in this operating mode functions thus as a refrigerant evaporator, from which the refrigerant flows over the suitably switched 3 way valve 20 and 4 way valve 19 back to the inlet side of the compressor 2. By suitably setting the switch of the 3 way valve 20 the cooling air/refrigerant heat exchanger 6 is inactive in this operating mode.

In heat pump mode the exhaust gas/coolant heat exchanger 16 is preferably active on the coolant side, as shown in FIG. 2, where the engine exhaust gas is led over the exhaust gas line branch 17a, assigned to said engine exhaust gas. Thus the coolant absorbs there the exhaust gas heat, which can be transferred in the following refrigerant/coolant heat exchanger 15 to the refrigerant, which then releases it in the supply air/refrigerant heat exchanger 4 to the supply air to be heated. Since in general after leaving the refrigerant/coolant heat exchanger 15 in the heat pump mode, the coolant is no longer so warm that the supply air at the heater 11 can be additionally heated, the supply air stream, as shown in FIG. 2, is guided past it. If, in contrast, the object is also to obtain supply air heat as a function of the system design and surrounding conditions, one alternative is to guide the supply air over the heater 11 by suitably reversing the air flap 14.

It follows from the described heat pump operation that it uses the heat generating capacity of the refrigerant cycle, switched as a heat pump, whereby the efficiency is preferably increased by the additional use of the exhaust gas heat. In this manner the interior can be adequately quickly heated especially in the case of a cold start at low outside temperatures even if the engine 1 is designed as a low consumption engine and releases in the cold start phase relatively little usable exhaust heat over its engine block. In the case of a cold start the engine exhaust gas constitutes the medium with the fastest temperature increase. The coolant can absorb this heat over the exhaust gas/coolant heat exchanger 16 as early as directly after starting the engine and feed said heat to the heat pump refrigerant cycle over the refrigerant/coolant heat exchanger 15, which functions as the heat pump evaporator, in order to raise said heat pump refrigerant cycle with virtually no delay to a temperature level that is high enough to heat the supply air. The fast increase in coolant temperature downstream of the exhaust gas/coolant heat exchanger 16 makes it possible to increase as fast as possible both the calorific output and the calorific value. This goal can be further facilitated, as desired, in that in this operating mode the coolant flow rate through the exhaust gas/coolant heat exchanger 16, the refrigerant/coolant heat exchanger 15 and the heater 11 is significantly reduced, because then the engine exhaust heat to be pumped is at its maximum temperature level, a feature that reduces the power required to drive the compressor 2.

Figure 3:
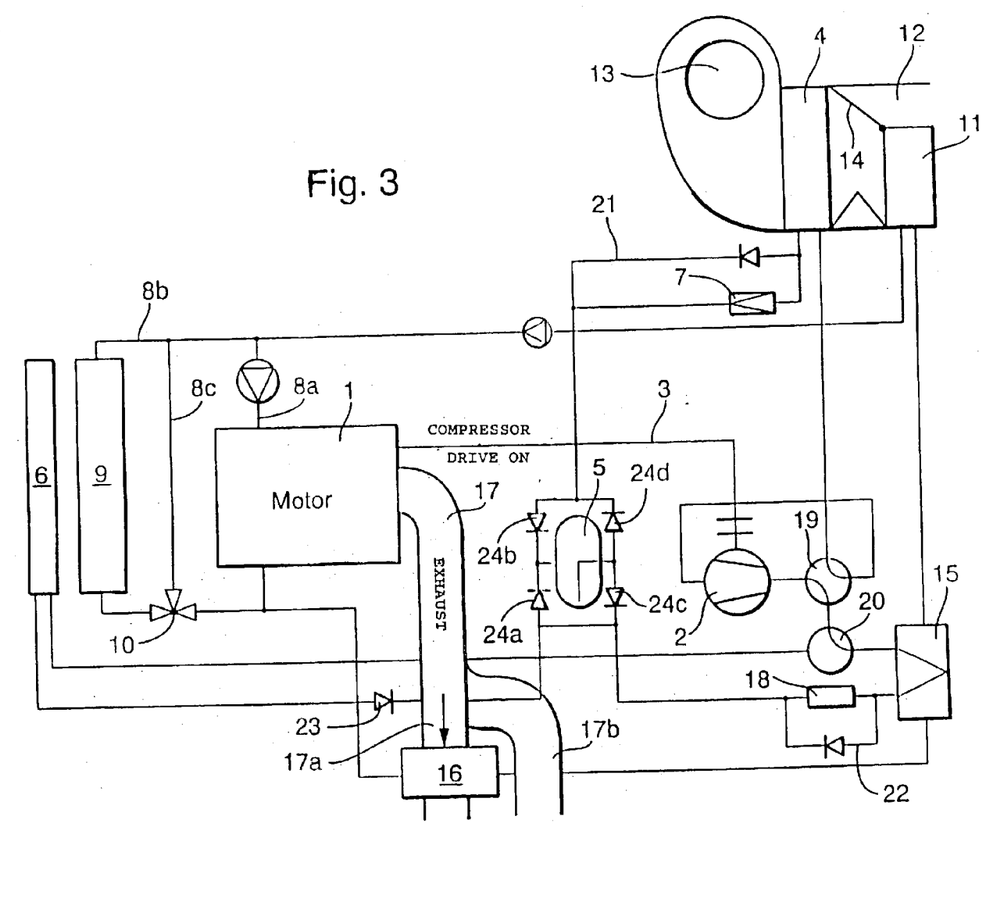
FIG. 3 is a view corresponding to FIG. 1, but with the system in the reheat mode.

As another operating option, the air conditioning system can be driven in reheat mode with heat recovery. FIG. 3 shows the system in this operating state. As apparent from the comparison with FIG. 1, the refrigerant cycle is driven in a modified air conditioning mode, where the supply air/refrigerant heat exchanger 4 in turn functions as the evaporator, in this case to cool the supply air for the purpose of drying. However, the heat, which is absorbed thereby by the supply air, is now transferred over the refrigerant/coolant heat exchanger 15, which in this operating state acts consequently as the condenser or gas cooler, to the coolant and from it to the heater 11 and in this manner recovered for reheating the previously cooled supply air. In this operating case with suitable adjustment of the air flap 14 the supply air is guided over the heater 11. In addition, the exhaust gas/coolant heat exchanger 16 can be active, if desired, through corresponding exhaust gas routing, when and to the extent the exhaust gas heat is also supposed to be used for reheating the supply air. To limit the calorific output of the supply air, the engine exhaust gas can be guided, first of all, past the exhaust gas/coolant heat exchanger 16; and secondly the heat transfer output of the refrigerant/coolant heat exchanger 15 can be reduced to the desired extent through, e.g. pulse-modulated, clocked activation of the 3 way valve 20. In this case the cooling air/refrigerant heat exchanger 6 assumes a part of the condenser/gas cooler function of the refrigerant/coolant heat exchanger 15.

The described reheat operating mode can be attained, as illustrated in FIG. 3, in turn in a simple manner through suitable control of the 4 way valve 19 and the 3 way valve 20; in this case, in such a manner that the supply air/refrigerant heat exchanger 4 is connected on the output side to the compressor inlet side and the compressor output side remains connected to the refrigerant/coolant heat exchanger 15 or is connected, on the one hand, to the same and, on the other hand, to the cooling air/refrigerant heat exchanger 6 so as to operate in switching mode. Moreover, the various check valves guarantee, as also in all other possible operating modes, the correct refrigerant flow routing through the high pressure accumulator 5. In particular, the refrigerant in this case is guided from the refrigerant/coolant heat exchanger 15 to the accumulator 5 over the bypass line 22 past the second expansion element 18, in order to flow from said accumulator over the first expansion element 7 into the supply air/refrigerant heat exchanger 4.

Figure 4:
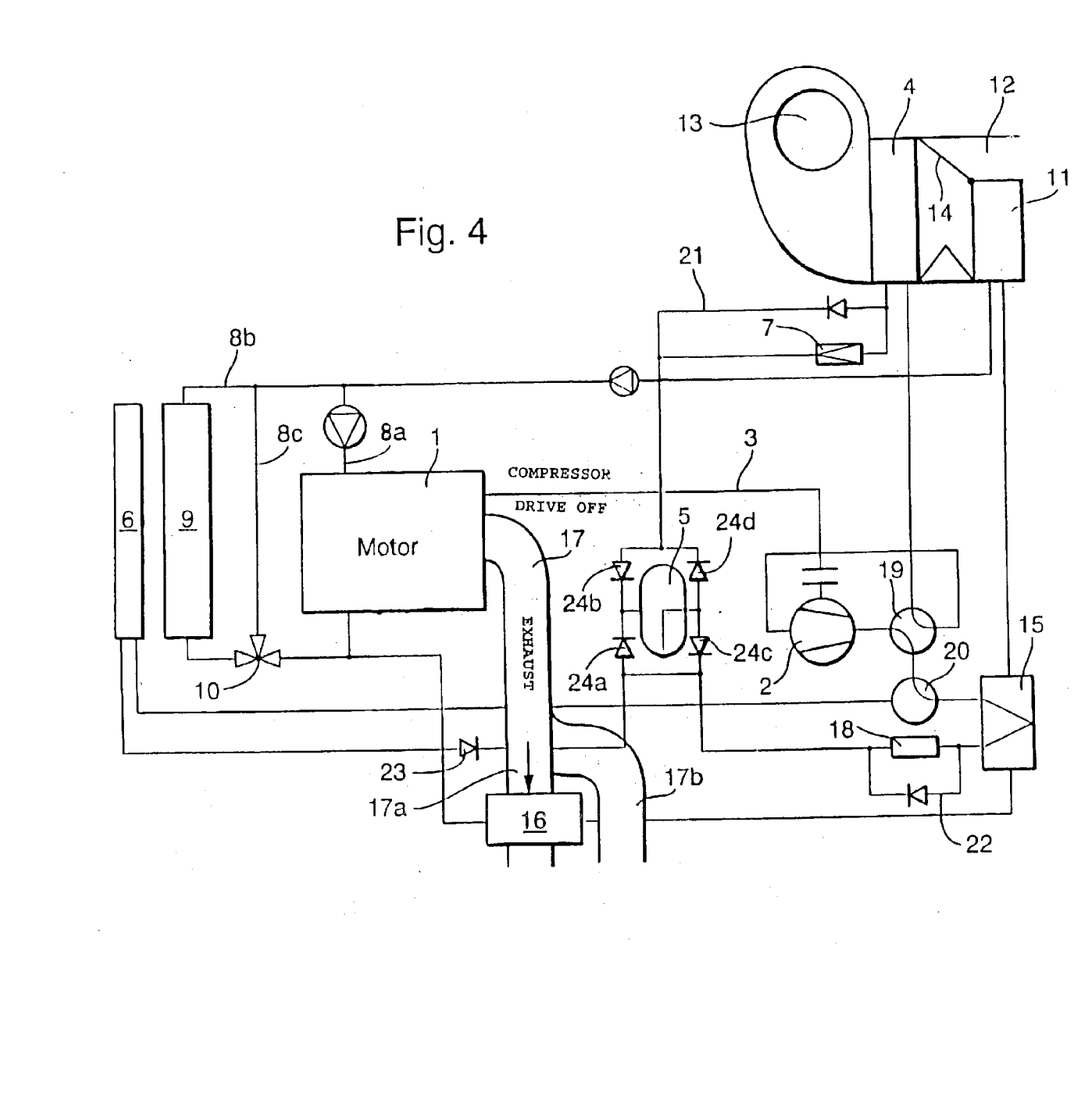
FIG. 4 is a view corresponding to FIG. 1, but with the system in the heating mode with exhaust gas heat recovery.
Figure 5:
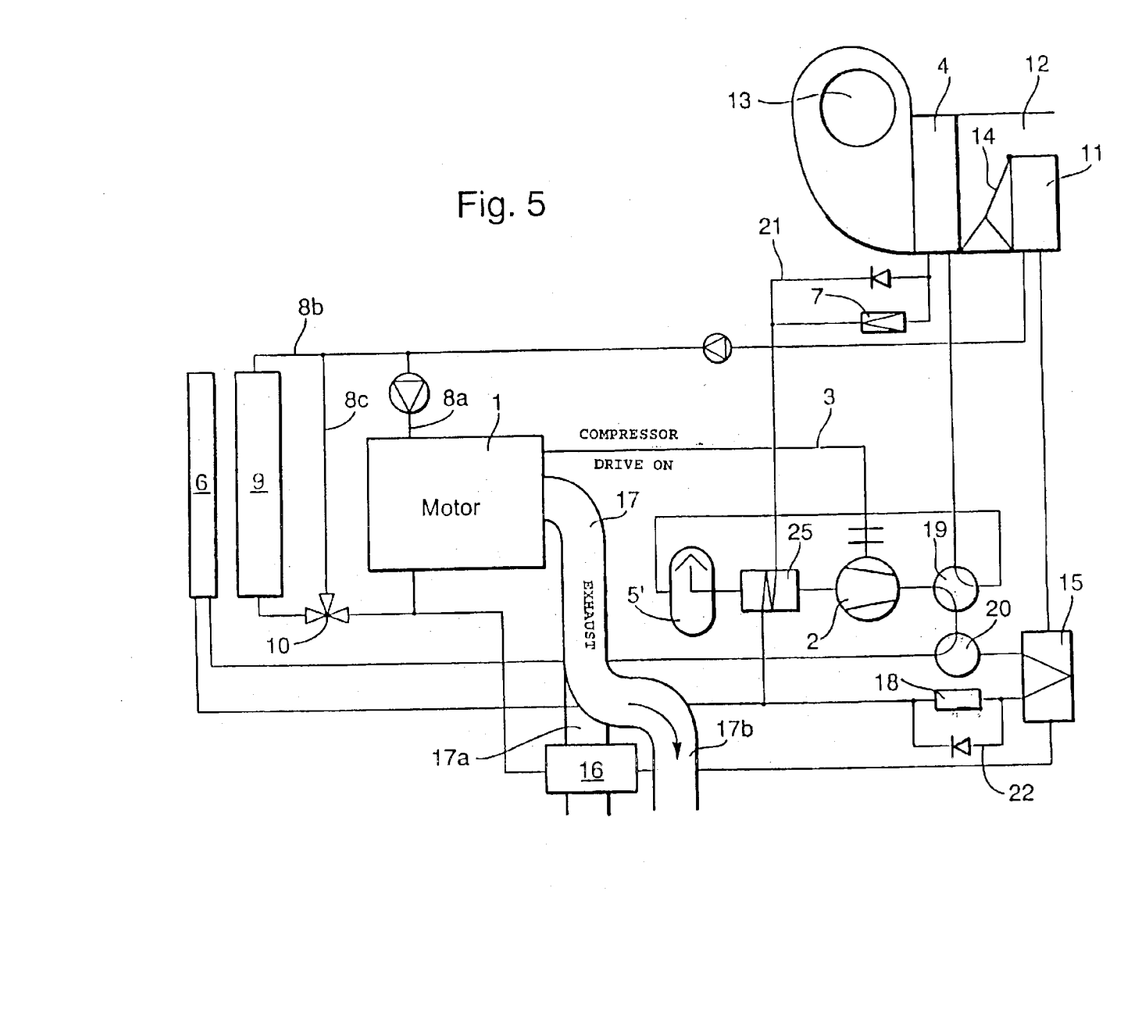
FIG. 5 is a block diagram of a motor vehicle air conditioning system constructed according to a second preferred embodiment of the invention, which can be operated, e.g. with the refrigerant $CO_2$ and which exhibits a low pressure-sided accumulator and internal heat exchanger in the state of air conditioning.

As another possible operating mode, FIG. 4 shows the air conditioning system in a heating mode with exhaust gas heat recovery. In this heating mode, the air conditioning system can be switched over especially when in the heat pump mode of FIG. 2, the coolant downstream of the exhaust gas/coolant heat exchanger 16 has reached a temperature level that is adequately high to heat the supply air directly with the heater 11. To this end, the compressor is turned off and thus the heat pump function of the refrigerant cycle is deactivated. The coolant, which is heated in the exhaust gas/coolant heat exchanger 16 and in the engine block 1, which is connected upstream in series (to the extent it exhibits any engine exhaust heat), passes without significant loss of heat the refrigerant/coolant heat exchanger 15, which is inactive in this operating mode, and flows then at an adequately high temperature into the heater 11. If the coolant mass flow was reduced in the previous heat pump operation, it is raised again to the normal value in the heating mode in order to avoid overheating the collar. If necessary, the exhaust gas/coolant heat exchanger 16 can also be deactivated in that the engine exhaust gas is removed by bypassing the same. It is self-evident that, instead of the illustrated selective activation or bypassing of the exhaust gas/coolant heat exchanger 16 with the exhaust gas stream for activating or deactivating the same, a selective activation or bypassing of this heat exchanger 16 can be provided on the coolant side, i.e. a selective bypassing of the same by means of the coolant over a related bypass line in the coolant cycle.

FIGS. 5 to 8 depict another air conditioning system in different operating modes, which are largely equivalent to those of FIGS. 1 to 4. In this respect the same reference numerals are used for functionally identical components, and hence reference can be made to the above description of the system in FIGS. 1 to 4. The different operating states of FIGS. 5 to 8 correspond to those in FIGS. 1 to 4 in this order of sequence so that with respect to the description of these different operating modes, the related respective interconnection of the air conditioning components and the achieved effects, reference can also be made to the above explanations for FIGS. 1 to 4.

The distinction between the air conditioning system of FIGS. 5 to 8 and that of FIGS. 1 to 4 lies in the fact that, instead of the high pressure-sided accumulator 5 and the assigned check valve arrangement 24a to 24d there are a low pressure-sided accumulator 5' and an internal heat exchanger 25, as customary in e.g. $CO_2$ systems. The accumulator 5' is connected on the inlet side to a connection of the 4 way valve 19 and on the outlet side to the inlet side of the compressor 2. In the low pressure-sided connecting segment between the accumulator 5' and the compressor 2 there is the internal heat exchanger 25 with its low pressure-sided refrigerant flow path. With its high pressure-sided refrigerant flow path it is connected, on the one hand, to the first expansion element 7 upstream of the supply air/refrigerant heat exchanger 4 and the related bypass line 21, and, on the other hand, to the refrigerant cycle segment between the refrigerant cooler 6 and the second expansion element 18 upstream of the refrigerant/coolant heat exchanger 15 and the related expansion element bypass line 22.

This assembly of the air conditioning system, which is also especially appropriate for the use of $CO_2$ as the refrigerant, can make do without a check valve arrangement, assigned to the accumulator 5', and can be operated in an equivalent manner in all of the operating modes, described for the system depicted in FIGS. 1 to 4. Thus, FIG. 5, analogous to FIG. 1, depicts the air conditioning system in air conditioning mode, in which the refrigerant/coolant heat exchanger 15 is deactivated by suitably switching the 3 way valve 20. The refrigerant, compressed by the compressor 2, is condensed or cooled in the cooling air/refrigerant heat exchanger 6, which acts as the condenser or the gas cooler, and flows from there to the internal heat exchanger 25, where it makes heat contact with the low pressure-sided refrigerant, sucked in from the accumulator 5', in order to flow subsequently over the first expansion element 7 into the supply air/refrigerant heat exchanger 4, which functions as the evaporator. From there the refrigerant passes over the 4 way valve 19 into the accumulator 5', from which it is exhausted by the compressor 2.

Figure 6:
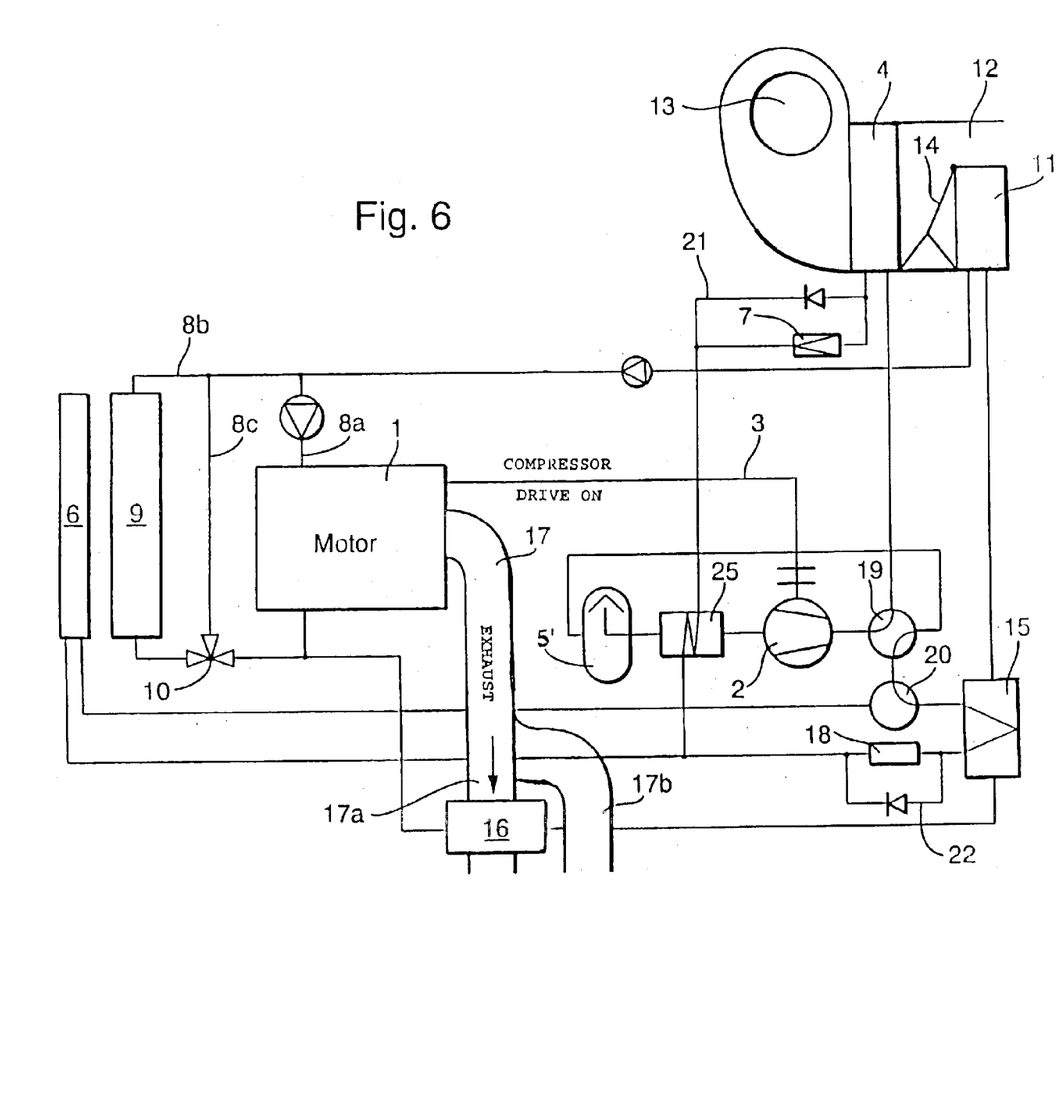
FIG. 6 is a view corresponding to FIG. 5, but with the system in the state of operating as a heat pump.

FIG. 6 shows, analogous to FIG. 2, the air conditioning system in the heat pump mode. The only difference from a flow engineering point of view between it and the heat pump operation of the air conditioning system with the high pressure-sided accumulator, according to FIG. 2, is that the refrigerant, issuing from the supply air/refrigerant heat exchanger 4, which in this case functions as the condenser/gas cooler, over the expansion element bypass line 21, is guided over the internal heat exchanger 25, from where it is fed over the second expansion element 18 to the refrigerant/coolant heat exchanger 15, functioning as the evaporator, whereas the refrigerant cooler 6 is inactive. The refrigerant, issuing from the refrigerant/coolant heat exchanger 15, flows over the 3 way valve 20 and the 4 way valve 19 into the accumulator 5', from where it is sucked in by the compressor 2.

Figure 7:
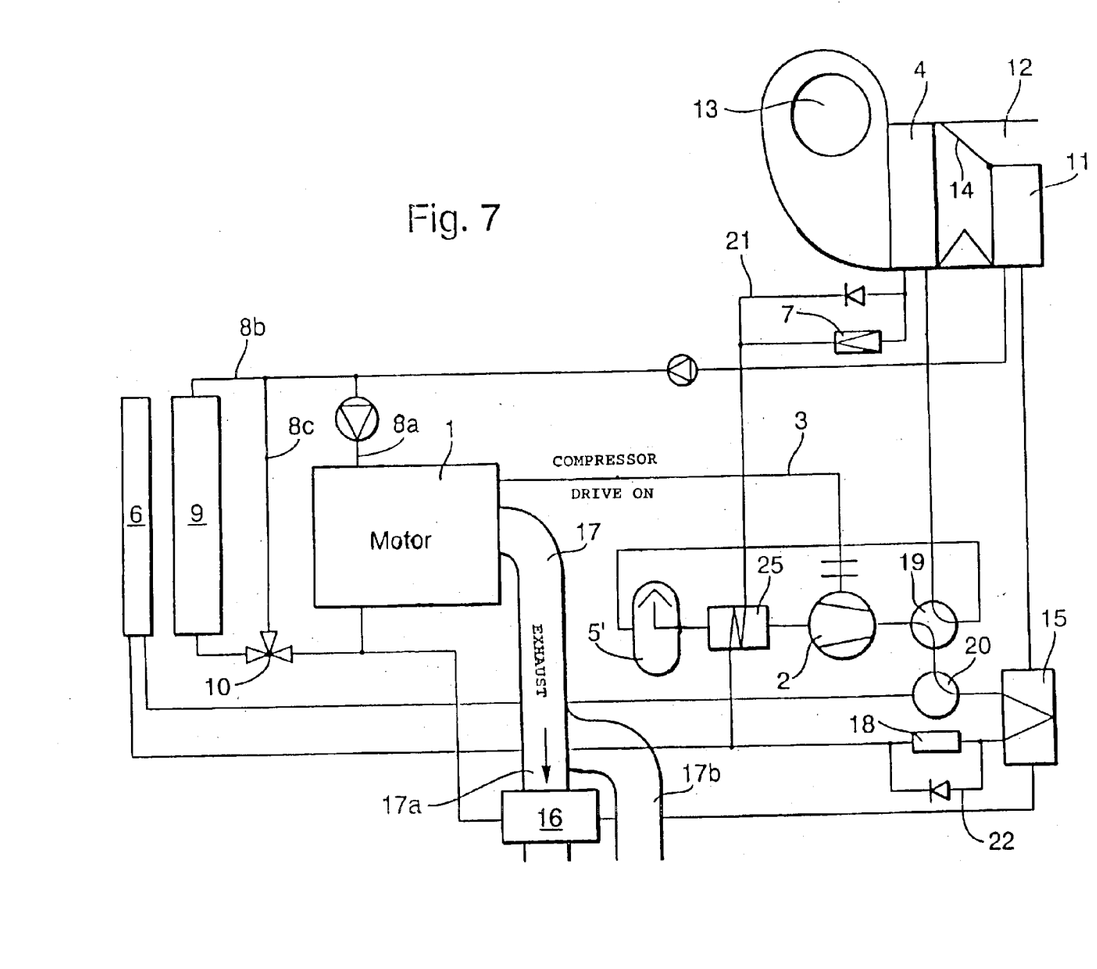
FIG. 7 is a view corresponding to FIG. 5, but with the system in the reheat mode.

FIG. 7 shows the second air conditioning system in reheat mode with heat recovery in accordance with the first air conditioning system in the state of FIG. 3. The refrigerant passes from the compressor 2 over the 4 way valve 19 and the 3 way valve 20 to the refrigerant/coolant heat exchanger 15, acting as the condenser/gas cooler, and from there over the expansion element bypass line 22 to the internal heat exchanger 25, whereas the cooling air/refrigerant heat exchanger 6 is inactive. From the internal heat exchanger 25 the high pressure-sided refrigerant flows over the first expansion element 7 to the supply air/refrigerant heat exchanger 4, functioning as the evaporator, in order to flow from there over the 4 way valve 19 into the accumulator 5', where it is again sucked off by the compressor 2 and is guided through the low pressure path of the internal heat exchanger 25.

Figure 8:
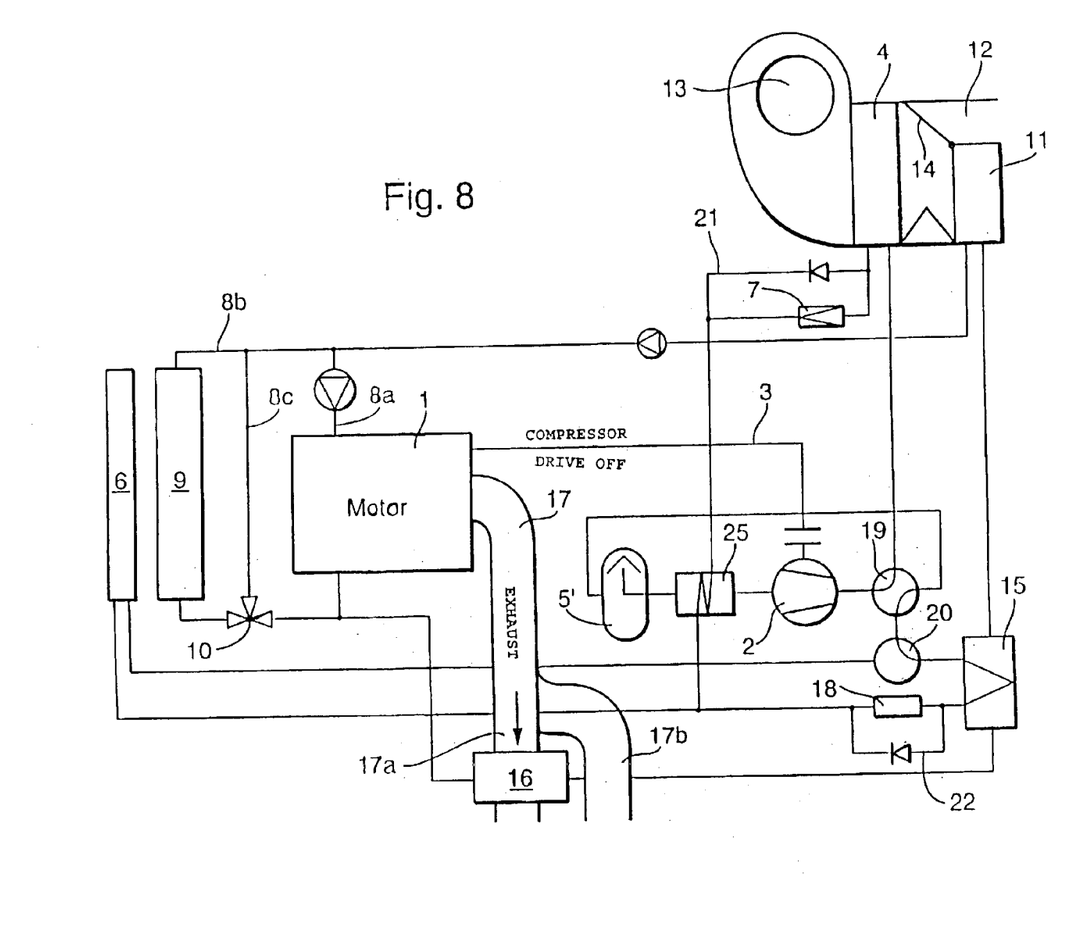
FIG. 8 is a view corresponding to FIG. 5, but with the system in the heating mode with exhaust gas heat recovery.

FIG. 8 shows the second air conditioning system in heating mode with exhaust gas heat recovery in accordance with the first air conditioning system in the operating state of FIG. 4. The compressor is turned off; and thus the refrigerant cycle is inactive. Heating the supply air over the refrigerant cycle is identical to that of the first air conditioning system. Hence reference can be made to the above description for FIG. 4.

It is well-known that in those cases in which the vehicle is shut down, whereas beforehand the supply air/refrigerant heat exchanger 4 had been active as the evaporator, as in air conditioning or reheat mode of the system, there is the problem of the water of condensation, precipitated on the evaporator, will re-evaporate at a subsequent cold start of the vehicle. This feature can result in undesired formation of mist on the windows and/or annoying odors. Both in the case of the first air conditioning system, according to FIGS. 1 to 4, and also in the second air conditioning system, according to FIGS. 5 to 8, the countermeasure consists of the fact that a supply air conveying blower 13 be used in the air conditioning unit that exhibits a reversible bidirectional conveying direction. In normal operation, during which supply air is conveyed into the vehicle interior, the blower 13 is activated in its corresponding first, normal conveying direction, in which it sucks in fresh air from the outside and feeds it into the supply air channel 12, leading to the vehicle interior. In contrast, the blower 13 in drying mode, is operated in the reversed, second conveying direction, in which it sucks air in the outward direction over the supply air channel 12.

Figure 9:
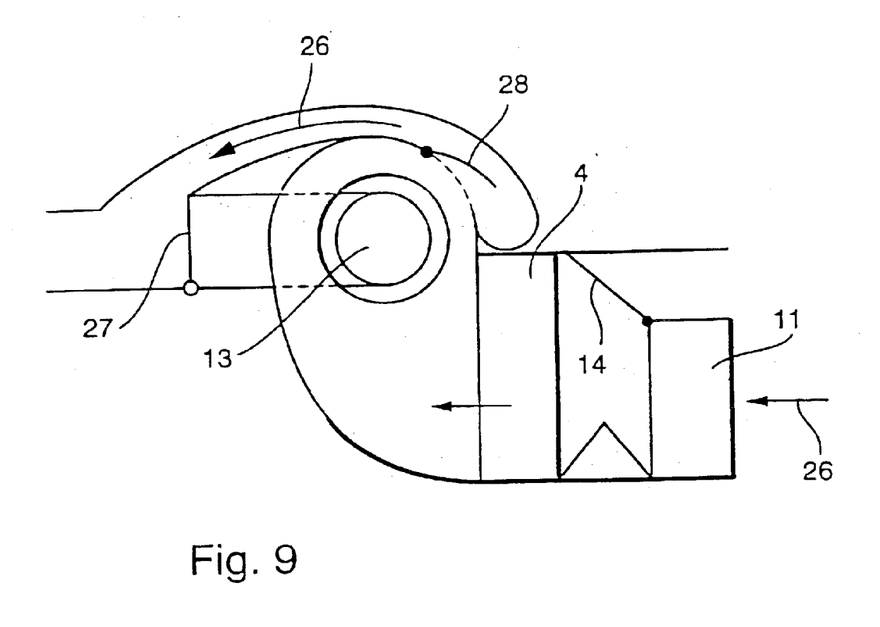
FIG. 9 is a sectional view of a detail of a schematic drawing of a segment of the supply air channel, which can be used in the systems depicted in FIGS. 1 to 8 and which includes a bidirectional supply air blower in the drying mode.

FIG. 9 shows the corresponding part of the air conditioning unit in this drying mode. As apparent, in this drying mode the supply air/refrigerant heat exchanger 4 can be dried with a drying air stream 26, which is represented by the flow arrows and sucked in, e.g. from the vehicle interior. The drying mode can be activated, in particular after each trip, during which the air conditioning system was operated in the air conditioning or reheat mode, in order to free the supply air/refrigerant heat exchanger 4, working as the evaporator during this period, from the precipitated water of condensation. To reverse the supply air conveying direction of the blower 13, two assigned air flaps 27, 28 are switched over into the appropriate positions and the running direction of the blower 13 is reversed, in order to support the reversal of the air flow in the air conditioning unit.

Preferably in drying mode the drying air 26, sucked in from the interior, is guided over the heater 11 by suitably setting the related air flap 14. Said heater is held active in the drying mode, in that the coolant continues to circulate in the coolant cycle for the specified time for the drying mode by continuing to operate the related coolant pump after the vehicle has been shut down. Thus, the residual heat in the coolant and in the engine block 1 can be used to heat the drying air 26 by means of the heater 11 before reaching the supply air/refrigerant heat exchanger 4 to be dried, a feature that promotes the drying effect. At the next cold start then, re-evaporation of the water of condensation at the supply air/refrigerant heat exchanger 4 into the supply air, passed into the vehicle interior, is avoided.

It is clear from the above embodiment that the inventive air conditioning system with relatively few apparatuses facilitates both an air conditioning mode and a heat pump mode, a reheat mode with heat recovery and a direct heating mode with or without exhaust gas heat recovery. In contrast to a conventional air conditioning system, which works only in the air conditioning mode, only the refrigerant/coolant heat exchanger, the exhaust gas/coolant heat exchanger, the two multiway valves for the refrigerant cycle, an additional expansion valve and some simple check valves are required in addition. Besides the conventional air conditioning mode in the summer and the conventional heating mode in the winter with the exclusive use of the engine exhaust heat, three other operating modes are possible, by means of which the heating capacity deficit of vehicles with low consumption internal combustion engines can be covered, depending on the temperature level in the heat exchanger mediums, with the respective maximum heat output and heat output coefficient. Heating in the heat pump mode is possible without significant heat losses in the engine block, a feature that keeps the warm-up phase of the internal combustion engine short and the fuel consumption, the emissions and the wear low. It is not necessary to use a second refrigerant-guiding heat exchanger, which works as the condenser, in the air conditioning unit, said use being difficult for reasons relating to the design space, whereas at the same time the heater can remain in the air conditioning unit and enables the direct use of coolant waste heat.

It is self-evident that, depending on the need for and with the omission of corresponding components, the inventive air conditioning system can be designed not only for air conditioning mode but also for a few other operating modes, as in the case of the above described embodiments. In this respect every combination of air conditioning mode with one or more of the other operating modes, i.e. heat pump mode, reheat mode, and direct heating mode with or without exhaust gas heat recovery and crying mode can be realized. Instead of the internal combustion engine, it is evident that a different component, generating heat during vehicle operation, can be connected to the relevant point in the coolant cycle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Air conditioning system for a motor vehicle, which air conditioning system is designed for an air conditioning operating mode and at least one of a heat pump operating mode and a reheat operating mode, said air conditioning system comprising:
    a refrigerant cycle with a compressor, a refrigerant cooler and a supply air/refrigerant heat exchanger, said supply air/refrigerant heat exchanger being disposed in a supply air channel and functioning as an evaporator in an air conditioning operating mode,
    a coolant cycle for cooling a heat generating vehicle component including a first coolant cooler for cooling an internal combustion engine of said motor vehicle,
    a refrigerant/coolant heat exchanger, coupling the refrigerant cycle and the coolant cycle so as to transfer heat,
    refrigerant flow control valves for controlling mode-dependent flow of the refrigerant so as to be guided in an air conditioning mode from the compressor over the refrigerant cooler to the supply air/refrigerant heat exchanger, and
    an internal combustion engine exhaust gas/coolant heat exchanger connected upstream in series to the refrigerant/coolant heat exchanger in the coolant cycle and connected downstream in series with the first coolant cooler of the internal combustion engine.

2. Air conditioning system for a motor vehicle according to claim 1,
    wherein said air conditioning system is designed for said reheat operating mode, in which the refrigerant flow control valves guide refrigerant flow from the compressor at least in part to the refrigerant/coolant heat exchanger, functioning as the condenser/gas cooler in said reheat operating mode, and from there to the supply air/refrigerant heat exchanger, functioning as the evaporator in this reheat operating mode, and
    wherein the refrigerant/coolant heat exchanger is connected upstream in series on the coolant side to a supply air/coolant heat exchanger disposed in the supply air channel.

3. Air conditioning system according to claim 2,
    comprising a supply air conveying unit which exhibits two operating modes with opposite supply air conveying directions at the supply air channel, and wherein the air conditioning system is designed for carrying out a drying operating mode, in that the supply air conveying unit conveys drying air for drying the supply air/refrigerant heat exchanger in the air conveying direction, reversed to the supply air conveying direction leading into the vehicle interior, past the supply air/refrigerant heat exchanger, whereby the drying mode is activated at least after shutdown of the vehicle in a previous air conditioning or reheat mode.

4. Air conditioning system according to claim 1, wherein said refrigerant flow control valves include:

a four way valve which is connected with a first connection to the compressor output side, with a second connection to the compressor inlet side, and with a third connection to the supply air/refrigerant heat exchanger, and with a first connection of a three-way valve.

5. Air conditioning system according to claim 1, wherein the refrigerant cycle includes a refrigerant high pressure side accumulator with an assigned check valve arrangement operably connecting the accumulator to the supply air/refrigerant heat exchanger, the refrigerant cooler and the refrigerant/coolant heat exchanger.

6. Air conditioning system according to claim 1, wherein the refrigerant cycle includes:

a refrigerant low pressure-sided accumulator, and an internal heat exchanger which is arranged on a low pressure side between the accumulator and the compressor and on a high pressure side is connected, on the one hand, to the supply air/refrigerant heat exchanger, and, on the other hand to the refrigerant cooler and the refrigerant/coolant heat exchanger.

7. Air conditioning system according to claim 1, comprising a supply air conveying unit which exhibits two operating modes with opposite supply air conveying directions at the supply air channel, and wherein the air conditioning system is designed for carrying out a drying operating mode, in that the supply air conveying unit conveys drying air for drying the supply air/refrigerant heat exchanger in the air conveying direction, reversed to the supply air conveying direction leading into the vehicle interior, past the supply air/refrigerant heat exchanger, whereby the drying mode is activated at least after shutdown of the vehicle in a previous air conditioning or reheat mode.

8. Air conditioning system for a motor vehicle according to claim 1, which air conditioning system is designed for an air conditioning operating mode and at least one of a heat pump operating mode and a reheat operating mode, said air conditioning system comprising:

a refrigerant cycle with a compressor, a refrigerant cooler and a supply air/refrigerant heat exchanger, said supply air/refrigerant heat exchanger being disposed in a supply air channel of a supply air conveying unit and functioning as an evaporator in an air conditioning operating mode, wherein the supply air conveying unit exhibits two operating modes with opposite supply air conveying directions, and wherein the air conditioning system is designed for carrying out a drying operating mode, in that the supply air conveying unit conveys drying air for drying the supply air/refrigerant heat exchanger in the air conveying direction, reversed to the supply air conveying direction leading into the vehicle interior, past the supply air/refrigerant heat exchanger, whereby the drying mode is activated at least after shutdown of the vehicle in a previous air conditioning or reheat mode.

9. Air conditioning system according to claim 8, wherein said refrigerant flow control valves include:

a four way valve which is connected with a first connection to the compressor output side, with a second connection to the compressor inlet side and with a third connection to the supply air/refrigerant heat exchanger, and with a first connection of a three-way valve.

10. Air conditioning system according to claim 8, wherein the refrigerant cycle includes a refrigerant high pressure side accumulator with an assigned check valve arrangement operably connecting the accumulator to the supply air/refrigerant heat exchanger, the refrigerant cooler and the refrigerant/coolant heat exchanger.

11. Air conditioning system according to claim 8, wherein the refrigerant cycle includes:

a refrigerant low pressure-sided accumulator, and an internal heat exchanger which is arranged on a low pressure side between the accumulator and the compressor and on a high pressure side is connected, on the one hand, to the supply air/refrigerant heat exchanger, and, on the other hand to the refrigerant cooler and the refrigerant/coolant heat exchanger.

12. Air conditioning system for a motor vehicle, which air conditioning system is designed for an air conditioning operating mode and a heat pump operating mode and a reheat operating mode, said air conditioning system comprising:

a refrigerant cycle with a compressor, a refrigerant cooler and a supply air/refrigerant heat exchanger, said supply air/refrigerant heat exchanger being disposed in a supply air channel and functioning as an evaporator in an air conditioning operating mode, a coolant cycle for cooling a heat generating vehicle component including a first coolant cooler for cooling an internal combustion engine of said motor vehicle, a refrigerant/coolant heat exchanger, coupling the refrigerant cycle and the coolant cycle so as to transfer heat, and refrigerant flow control valves for controlling mode-dependent flow of the refrigerant so as to be guided in an air conditioning mode from the compressor over the refrigerant cooler to the supply air/refrigerant heat exchanger, wherein said reheat operating mode, in which the refrigerant flow control valves guide refrigerant flow from the compressor at least in part to the refrigerant/coolant heat exchanger, functions as the condenser/gas cooler, and from there to the supply air/refrigerant heat exchanger, functioning as the evaporator in said reheat mode, and wherein the refrigerant/coolant heat exchanger is connected upstream in series on the coolant side to a supply air/coolant heat exchanger disposed in the supply air channel and connected downstream in series with the first coolant cooler of the internal combustion engine.

13. An air conditioning system according to claim 12, wherein said refrigerant flow control valves include:

a four way valve which is connected with a first connection to the compressor output side, with a second connection to the compressor inlet side and with a third connection to the supply air/refrigerant heat exchanger, and with a first connection of a three-way valve.

14. Air conditioning system according to claim 12, wherein the refrigerant cycle includes a refrigerant high pressure side accumulator with an assigned check valve arrangement operably connecting the accumulator to the supply air/refrigerant heat exchanger, the refrigerant cooler and the refrigerant/coolant heat exchanger.

15. Air conditioning system according to claim 12, wherein the refrigerant cycle includes:
   a refrigerant low pressure-sided accumulator, and
   an internal heat exchanger which is arranged on a low pressure side between the accumulator and the compressor and on a high pressure side is connected, on the one hand, to the supply air/refrigerant heat exchanger, and, on the other hand to the refrigerant cooler and the refrigerant/coolant heat exchanger.

16. A method of operating an air conditioning system for a motor vehicle, which air conditioning system is designed for an air conditioning operating mode and at least one of a heat pump operating mode and a reheat operating mode, said air conditioning system comprising:
   a refrigerant cycle with a compressor, a refrigerant cooler and a supply air/refrigerant heat exchanger, said supply air/refrigerant heat exchanger being disposed in a supply air channel and functioning as an evaporator in an air conditioning operating mode,
   a coolant cycle for cooling a heat generating vehicle component a first coolant cooler for cooling an internal combustion engine of said motor vehicle,
   a refrigerant/coolant heat exchanger, coupling the refrigerant cycle and the coolant cycle so as to transfer heat,
   refrigerant flow control valves for controlling mode-dependent flow of the refrigerant so as to be guided in the air conditioning mode from the compressor over the refrigerant cooler to the supply air/refrigerant heat exchanger, and
   an internal combustion engine exhaust gas/coolant heat exchanger connected upstream in series to the refrigerant/coolant heat exchanger in the coolant cycle and connected downstream in series with the first coolant cooler of the internal combustion engine,
   said method including controlling said refrigerant control valves to switch the air conditioning system between an air conditioning operating mode and one of the heat pump operating mode and the reheat operating mode.

17. A method of operating an air conditioning system according to claim 16,
   wherein said controlling said refrigerant control valve is operable to switch the air conditioning system between the air conditioning mode and the reheat operating mode, in which the refrigerant flow control valves guide refrigerant flow from the compressor at least in part to the refrigerant/coolant heat exchanger, functioning as the condenser/gas cooler in the reheat operating mode, and from there to the supply air/refrigerant heat exchanger, functioning as the evaporator in the reheat operating mode, and
   wherein the refrigerant/coolant heat exchanger is connected upstream in series on the coolant side to a supply air/coolant heat exchanger disposed in the supply air channel.

18. A method of operating an air conditioning system according to claim 16,
   wherein a supply air conveying unit for supplying air at the air supply channel exhibits two operating modes with opposite supply air conveying directions, and
   wherein the air conditioning system is designed for carrying out a drying operating mode wherein the supply air conveying unit conveys drying air for drying the supply air/refrigerant heat exchanger in the air conveying direction, reversed to the supply air conveying direction leading into the vehicle interior, past the supply air/refrigerant heat exchanger, whereby the drying mode is activated at least after shutdown of the vehicle when in an air conditioning or reheat mode.

19. A method of operating an air conditioning system for a motor vehicle, which air conditioning system is designed for an air conditioning operating mode and at least one of a heat pump operating mode and a reheat operating mode, said air conditioning system comprising:
   a refrigerant cycle with a compressor, a refrigerant cooler and a supply air/refrigerant heat exchanger, said supply air/refrigerant heat exchanger being disposed in a supply air channel and functioning as an evaporator in the air conditioning operating mode,
   a coolant cycle for cooling a heat generating vehicle component a first coolant for cooling an internal combustion engine of said motor vehicle,
   a refrigerant/coolant heat exchanger, coupling the refrigerant cycle and the coolant cycle so as to transfer heat, and
   refrigerant flow control valves for controlling mode-dependent flow of the refrigerant so as to be guided in the air conditioning mode from the compressor over the refrigerant cooler to the supply air/refrigerant heat exchanger, and
   said method including controlling said refrigerant control valves to switch the air conditioning system between the air conditioning operating mode and the at least one of a heat pump operating mode and a reheat operating mode,
   wherein said at least one of a heat pump operating mode and a reheat operating mode includes a reheat operating mode, in which the refrigerant flow control valves guide refrigerant flow from the compressor at least in part to the refrigerant/coolant heat exchanger, functioning as the condenser/gas cooler in said reheat operating mode, and from there to the supply air/refrigerant heat exchanger, functioning as the evaporator in said reheat operating mode, and
   wherein the refrigerant/coolant heat exchanger is connected upstream in series on the coolant side to a supply air/coolant heat exchanger disposed in the supply air channel and connected downstream in series with the first coolant cooler of the internal combustion engine.

20. A method of operating an air conditioning system for a motor vehicle, which air conditioning system is designed for an air conditioning operating mode and at least one of a heat pump operating mode and a reheat operating mode, said air conditioning system comprising:
   a refrigerant cycle with a compressor, a refrigerant cooler and a supply air/refrigerant heat exchanger, said supply air/refrigerant heat exchanger being disposed in a supply air channel of a supply air conveying unit and functioning as an evaporator in an air conditioning operating mode,
   wherein the supply air conveying unit exhibits two operating modes with opposite supply air conveying directions, and
   wherein the air conditioning system is designed for carrying out a drying operating mode, in that the supply air conveying unit conveys drying air for drying the supply air/refrigerant heat exchanger in the air conveying direction, reversed to the supply air conveying direction leading into the vehicle interior, past the supply air/refrigerant heat exchanger, whereby the drying mode is activated at least after shutdown of the vehicle in a previous air conditioning or reheat mode, said method including switching the supply air conveying direction to and from the drying mode.

* * * * *